United States Patent
Peng

(10) Patent No.: US 11,683,869 B2
(45) Date of Patent: Jun. 20, 2023

(54) LIGHT-EMITTING DIODE LIGHT STRING CONTROL SYSTEM USING CARRIER SIGNAL CONTROL AND SIGNAL CONTROL METHOD THEREOF

(71) Applicant: Semisilicon Technology Corp., New Taipei (TW)

(72) Inventor: Wen-Chi Peng, New Taipei (TW)

(73) Assignee: SEMISILICON TECHNOLOGY CORP., New Taipei (TW)

( * ) Notice: Subject to any disclaimer, the term of this patent is extended or adjusted under 35 U.S.C. 154(b) by 291 days.

(21) Appl. No.: 17/221,095

(22) Filed: Apr. 2, 2021

(65) Prior Publication Data

US 2021/0227658 A1 Jul. 22, 2021

Related U.S. Application Data

(63) Continuation-in-part of application No. 16/444,284, filed on Jun. 18, 2019, now Pat. No. 11,085,620.

(30) Foreign Application Priority Data

May 9, 2019 (CN) .......................... 201910384047.5
Feb. 23, 2021 (TW) ................................ 110106272

(51) Int. Cl.
H05B 45/32 (2020.01)
H05B 47/16 (2020.01)
(Continued)

(52) U.S. Cl.
CPC ............ *H05B 45/32* (2020.01); *H05B 45/10* (2020.01); *H05B 47/16* (2020.01); *H05B 47/165* (2020.01)

(58) Field of Classification Search
CPC ...... H05B 47/16; H05B 47/165; H05B 45/32; H05B 45/10; H05B 45/325; H05B 45/12; H05B 45/14; H05B 47/10; Y02B 20/40
See application file for complete search history.

(56) References Cited

U.S. PATENT DOCUMENTS 8,203,320 B2 6/2012 Leman et al.
9,930,734 B2 * 3/2018 Peng .................. H05B 45/30
(Continued)

FOREIGN PATENT DOCUMENTS

CN 103238268 A 8/2013
CN 205793546 U 12/2016
(Continued)

OTHER PUBLICATIONS

European search report dated Mar. 31, 2022 of corresponding European patent Application No. 21204466.3, 10 pages.
(Continued)

*Primary Examiner* — Seokjin Kim
(74) *Attorney, Agent, or Firm* — Muncy, Geissler, Olds & Lowe, P.C.

(57) ABSTRACT

A light-emitting diode (LED) light string control system using carrier signal control includes a control module and an LED light string coupled to the control module. The control module converts a DC voltage into a lighting drive signal according to a lighting command. The LED light string includes at least one LED module, and the at least one LED module includes a detection circuit, a logic circuit, and an oscillator. The detection circuit generates a detected signal corresponding to the lighting drive signal. The logic circuit determines a first level being a first logic signal, a second logic signal, or a latch signal according to a time duration of the detected signal at the first level. The oscillator provides a clock signal to the logic circuit for calculating the time duration according to the first level.

10 Claims, 4 Drawing Sheets

(51) Int. Cl.
*H05B 47/165* (2020.01)
*H05B 45/10* (2020.01)

(56) References Cited

U.S. PATENT DOCUMENTS

| | | | |
|---|---|---|---|
| 10,039,164 B1* | 7/2018 | Peng | H05B 45/32 |
| 2007/0114986 A1 | 5/2007 | Yoshii | |
| 2012/0127214 A1* | 5/2012 | Han | H05B 45/347 |
| | | | 315/122 |
| 2015/0061524 A1* | 3/2015 | Kunimatsu | H05B 45/10 |
| | | | 315/307 |
| 2016/0066380 A1 | 3/2016 | Wang et al. | |
| 2016/0119277 A1 | 4/2016 | Peng | |
| 2016/0308358 A1 | 10/2016 | Sean et al. | |
| 2016/0330808 A1 | 11/2016 | Brandt | |
| 2017/0317587 A1* | 11/2017 | Zhang | G01R 19/16585 |
| 2017/0347417 A1* | 11/2017 | Chen | H05B 45/14 |
| 2017/0373603 A1* | 12/2017 | Basso | H02H 7/10 |
| 2020/0355358 A1 | 11/2020 | Peng | |
| 2022/0030680 A1* | 1/2022 | Peng | H05B 45/10 |

FOREIGN PATENT DOCUMENTS

| | | |
|---|---|---|
| TW | 201204171 A | 1/2012 |
| TW | M450891 U | 4/2013 |
| TW | 201540125 A | 10/2015 |
| TW | 201626853 A | 7/2016 |
| TW | I678945 B | 12/2019 |
| TW | I701971 B | 8/2020 |

OTHER PUBLICATIONS

Chinese Office Action dated Oct. 18, 2019 in application No. 201910384047.5.
Office Action issued in corresponding Taiwan patent application No. 108116546 dated Aug. 4, 2020.

* cited by examiner

LIGHT-EMITTING DIODE LIGHT STRING CONTROL SYSTEM USING CARRIER SIGNAL CONTROL AND SIGNAL CONTROL METHOD THEREOF

CROSS-REFERENCE TO RELATED APPLICATIONS

This application claims priority to TW110106272 filed Feb. 23, 2021 and is a continuing-in part application of U.S. patent application Ser. No. 16/444,284, filed on Jun. 18, 2019, and entitled "CARRY-SIGNAL CONTROLLED LED LIGHT WITH LOW POWER CONSUMPTION AND LED LIGHT STRING HAVING THE SAME" which claims priority to CN201910384047.5 filed May 9, 2019. The entire disclosures of the above applications are all incorporated herein by reference.

BACKGROUND

Technical Field

The present disclosure relates to a light-emitting diode (LED) light control system and a signal control method thereof, and more particularly to an LED light control system using carrier signal control and a signal control method thereof.

Description of Related Art

The statements in this section merely provide background information related to the present disclosure and do not necessarily constitute prior art.

As the applications of light-emitting diodes (LEDs) are becoming more and more popular, and their manufacturing costs are getting lower and lower, the applications of LEDs in lighting or display are becoming more and more widespread. Therefore, there are more and more manners to operate and control lighting behavior of LEDs. In the applications of the LED light string, since it is necessary to set lighting behavior of each LED, the LED light string can produce a visual effect. Accordingly, a controller should be used to control each LED, and each controller also has the function of identifying signals so as to be able to determine whether the signals are specific lighting commands.

However, the signal received by the controller must be also used for the internal operating power of the controller. In the process of identifying the signal, the controller consumes a large amount of power, causing the voltage level of the signal to gradually decrease. If the voltage level of this signal cannot maintain the normal operation of the controller, the LED light string will fail.

SUMMARY

In order to solve the above-mentioned problems, a light-emitting diode (LED) light string control system using carrier signal control is provided. The LED light string control system using carrier signal control includes a control module and an LED light string. The control module converts a DC voltage into a lighting drive signal according to a lighting command. The LED light string includes at least one LED module, and is coupled to the control module. The at least one LED module includes a detection circuit, a logic circuit, and an oscillator. The detection circuit generates a detected signal corresponding to the lighting drive signal. The logic circuit determines a first level being a first logic signal, a second logic signal, or a latch signal according to a time duration of the detected signal at the first level. The oscillator provides a clock signal to the logic circuit for calculating the time duration according to the first level and goes into a sleep mode according to a sleep signal. The logic circuit provides the sleep signal according to the detected signal at a second level, or the detected signal at the second level is used as the sleep signal for the oscillator.

In order to solve the above-mentioned problems, a signal control method of a light-emitting diode (LED) light string is provided. The signal control method includes steps of: converting a DC voltage into a lighting drive signal according to a lighting command, generating a detected signal corresponding to the lighting drive signal, determining a first level being a first logic signal, a second logic signal, or a latch signal according to a time duration of the detected signal at the first level, and providing a clock signal according to the first level and calculating the time duration by the clock signal.

The main purpose and effect of the present disclosure are that a logic determination is performed when the lighting drive signal is at the high-level voltage and the LED module sleeps when the lighting drive signal is at the low-level voltage. Therefore, when the lighting drive signal is at the low-level voltage, the LED module hardly consumes power, which can prevent the voltage level of the lighting drive signal from being lower than the reset voltage of the LED module due to excessive power consumption.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Figure 1:
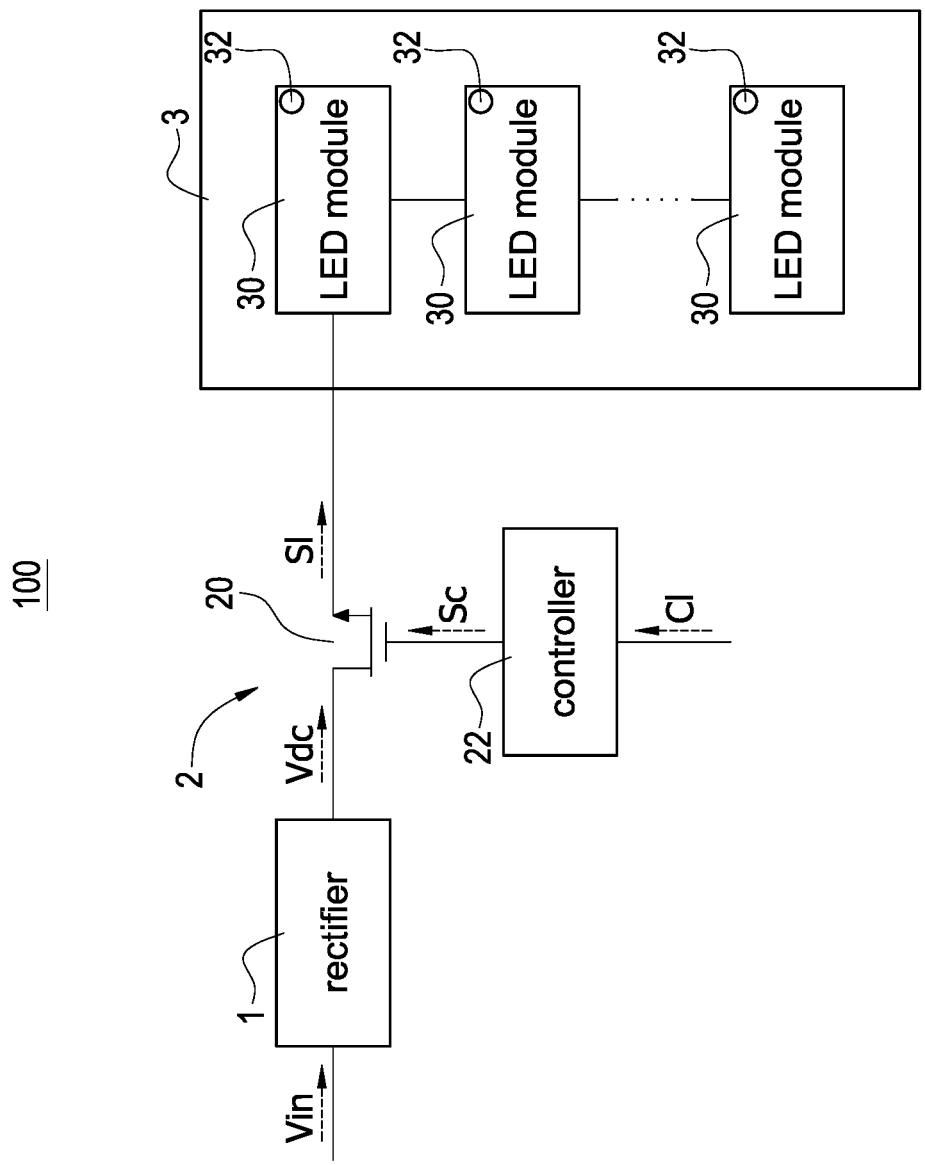
FIG. 1 is a block circuit diagram of a light-emitting diode (LED) light string control system using carrier signal control according to the present disclosure.

Reference will now be made to the drawing figures to describe the present disclosure in detail. It will be understood that the drawing figures and exemplified embodiments of present disclosure are not limited to the details thereof.

Please refer to FIG. 1, which shows a block circuit diagram of a light-emitting diode (LED) light string control system using carrier signal control according to the present disclosure. The LED light string control system 100 receives an input voltage Vin through an input end. The LED light string control system 100 includes a rectifier 1, a control module 2, and an LED light string 3. The control module 2 is coupled to the rectifier 1 and the LED light string 3. The rectifier 1 rectifies an AC input voltage Vin into a DC voltage Vdc. The control module 2 receives the DC voltage Vdc, and converts (switches) the DC voltage Vdc into a carry-based lighting drive signal Sl according to a lighting command Cl externally provided. The LED light string 3 is coupled to the control module 2, and the LED light string 3 includes at least one LED module 30 (multiple LED modules 30 are exemplified for demonstration in this embodiment). Each LED module 30 includes at least one LED 32, and the LED module 30 controls lighting behavior of the at least one LED 32 according to the lighting drive signal Sl. When the at least one LED module 30 is plural, these LED modules 30 may be coupled in series (shown in FIG. 1) or coupled in parallel (not shown). In one embodiment, the LED light string control system 100 may not include the rectifier 1, that is, the LED light string control system 100 directly receives the DC voltage Vdc as the input voltage. Alternatively, the rectifier 1 may be replaced by a DC converter, and the DC converter receives a DC input voltage Vin and converts the input voltage Vin into the DC voltage Vdc.

The control module 2 includes a power switch 20 and a controller 22. The power switch 20 is coupled between the rectifier 1 and the LED light string 3. The controller 22 is coupled to a control end of the power switch 20, and provides a control signal Sc to control turning on and turning off the power switch 20 according to the lighting command Cl so as to convert (switch) the DC voltage Vdc into the lighting drive signal Sl by turning on and turning off the power switch 20. In particular, the controller 22 may not include a traditional lighting signal generator, and generates the lighting drive signal Sl with changes in high-level voltage and low-level voltage by controlling turning on or turning off the power switch 20.

Figure 2:
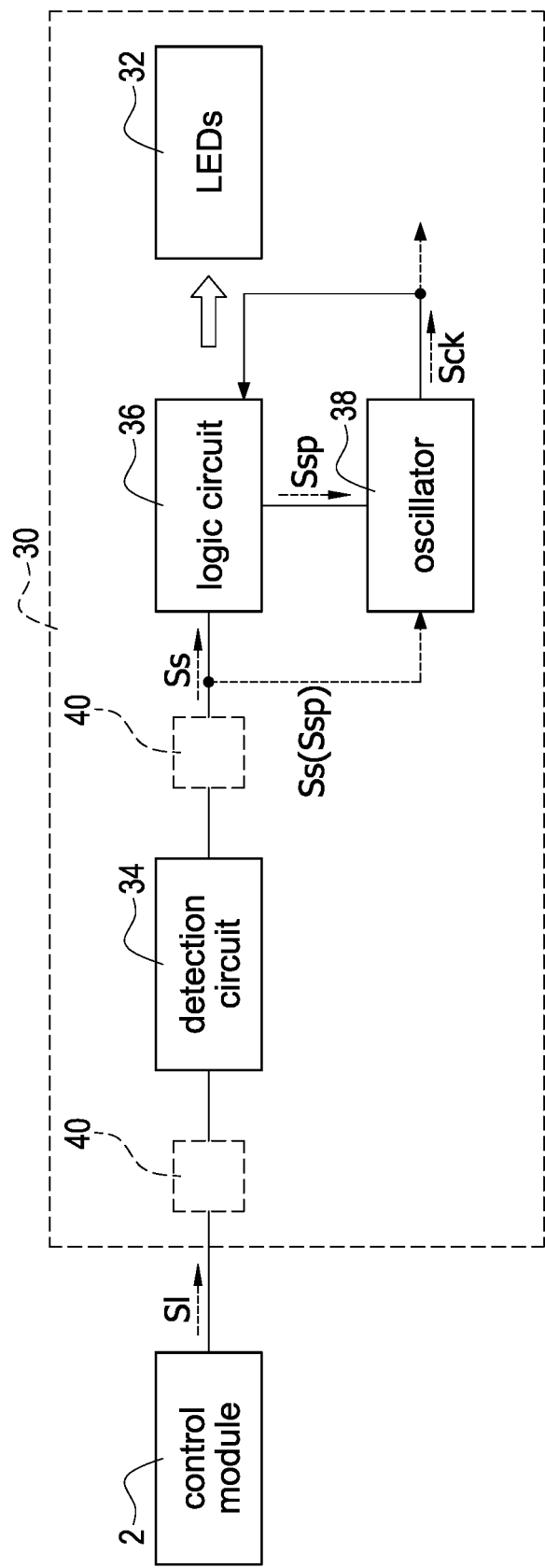
FIG. 2 is a block circuit diagram of an LED module according to the present disclosure.

Please refer to FIG. 2, which shows a block circuit diagram of an LED module according to the present disclosure, and also refer to FIG. 1. Each LED module 30 further includes a detection circuit 34, a logic circuit 36, and an oscillator 38. The detection circuit 34 is coupled to the control module 2, and detects the lighting drive signal Sl to generate a detected signal Ss corresponding to the lighting drive signal Sl. The logic circuit 36 is coupled to the detection circuit 34, and determines whether to provide a sleep signal Ssp according to the detected signal Ss. In one embodiment, the sleep signal is, but not limited to, an internal signal. The oscillator 38 is coupled to the logic circuit 36, and whether the oscillator 38 goes to sleep (i.e., goes into a sleep mode) or not depends on whether it receives the sleep signal Ssp.

Specifically, the detection circuit 34 may generate the detected signal Ss complementary to the lighting drive signal Sl or proportional to the lighting drive signal Sl by detecting the lighting drive signal Sl. The logic circuit 36 determines whether the first level is the first logic signal (such as logic "0"), the second logic signal (such as logic "1"), or the latch signal according to a time duration of the detected signal Ss at the first level. The logic circuit 36 provides the sleep signal Ssp according to the detected signal Ss at a second level, or the detected signal Ss at the second level is directly used as the sleep signal Ssp for the oscillator 38. Therefore, the oscillator 38 is controlled to go to sleep to save power consume when the lighting drive signal Sl is at the low-level voltage so that the low-level voltage will be not consumed too much and be not lower than the reset voltage. When the oscillator 38 does not receive the sleep signal Ssp, the oscillator 38 provides the clock signal Sck to the logic circuit 36 for calculating the time duration. When the oscillator 38 receives the sleep signal Ssp, the oscillator 38 goes to sleep (or goes into a sleep mode) and does not provide the clock signal Sck so that internal circuits (such as latch circuits, drive circuits, etc.) operated based on the clock signal Sck will also go to sleep due to the absence of the clock signal Sck, thereby significantly reducing the power consume of the LED module 30.

When the logic circuit 36 determines that the time duration of the detected signal Ss at the first level is the latch signal, the logic circuit 36 notifies the LED module 30 to latch and memorize (store) the temporarily stored first logic signal and second logic signal as a drive command. Afterward, the LED module 30 may use the drive command to control lighting behavior of the LED 32. Take the complementary of the lighting drive signal Sl and the detected signal Ss as an example, the first level, i.e., the low-level voltage is corresponding to the high-level voltage of the lighting drive signal Sl, and the second level, i.e., the high-level voltage) is corresponding to the low-level voltage of the lighting drive signal Sl.

Moreover, in order to reduce the installation cost of the LED light string control system 100, the LED module 30 without the power-off memory function is usually implemented. The LED module 30 with the power-off memory function will reset and forget the settings and the memorized drive commands when the received power (i.e., the lighting drive signal Sl) of the LED module 30 is lower than the reset voltage (i.e., the required working voltage for internal operation). In order to avoid the above situation, the operation of the LED light string control system 100 is usually to prevent the voltage level of the lighting drive signal Sl from being lower than the reset voltage as much as possible. However, the lighting drive signal Sl is usually a pulse voltage with alternating high voltage level and low voltage level. When the lighting drive signal Sl is at the low level voltage for logic determination (that is, the first logic signal, the second logic signal, and the latch signal are determined), the LED module 30 is still working and consumes power. Therefore, it is easy to happen that the voltage level of the lighting drive signal Sl is consumed below the reset voltage due to excessive power consumption during the determination process.

The main purpose and effect of the present disclosure are that a logic determination is performed when the lighting drive signal Sl is at the high-level voltage and the LED module 30 goes to sleep when the lighting drive signal Sl is at the low-level voltage. Therefore, when the lighting drive signal Sl is at the low-level voltage, the LED module 30 hardly consumes power, which can prevent the voltage level of the lighting drive signal Sl from being lower than the reset voltage of the LED module 30 due to excessive power consumption.

Please refer to FIG. 2 again, each LED module 30 further include a filter circuit 40, and the filter circuit 40 is coupled to the detection circuit 34. The filter circuit 40 may be coupled between the detection circuit 34 and the control module 2 for filtering noise of the lighting drive signal Sl. Alternatively, the filter circuit 40 may be coupled between the detection circuit 34 and the logic circuit 36 for filtering noise of the detected signal Ss. Specifically, since the lighting drive signal Sl is a high-power signal and the power switch 20 is switched at a high frequency, the lighting drive signal Sl produces more rough edges or switching surges, and the rough edges or switching surges will affect the detection accuracy of the time duration of the detected signal Ss. It even misjudges the signal that should be logic "0" or logic "1" as other signals. Therefore, using the filter circuit 40 to filter noise of the lighting drive signal Sl or noise of the detected signal Ss is a preferred embodiment of the LED light string control system 100. Since the LED module 30 is a weak-current operation and consumes less power during operation, the filter circuit 40 coupled between the detection circuit 34 and the logic circuit 36 is a preferred embodiment.

Figure 3:
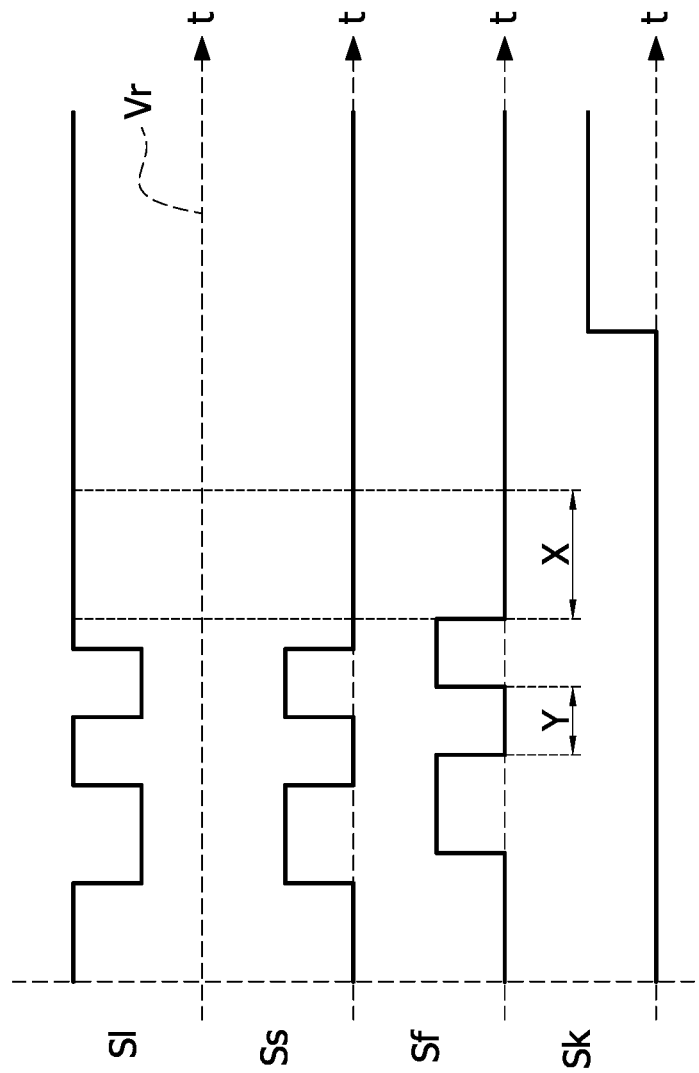
FIG. 3 is a waveform diagram of signals related to the LED light string control system according to the present disclosure.

Please refer to FIG. 3, which shows a waveform diagram of signals related to the LED light string control system according to the present disclosure, and also refer to FIG. 1 and FIG. 2. In FIG. 3, Sl is the lighting drive signal, Ss is the detected signal, Sf is a filtered detected signal (hereinafter referred to as "filtered signal Sf", and Sk is a latched signal. The control module 2 converts (switches) the DC voltage Vdc into the carry-based lighting drive signal Sl. The lighting drive signal Sl has a high-level voltage and a low-level voltage, and the low-level voltage is not lower than a reset voltage Vr. In the lighting drive signal Sl, there is a high-level voltage with a longer width X, which represents that the previous carrier has been generated, and the correspondingly received LED module 30 can latch the drive command corresponding to the previous carrier. The detection circuit 34 detects the lighting drive signal Sl to generate a detected signal Ss complementary to the lighting drive signal Sl, and the filter circuit 40 filters the detected signal Ss to generate the filtered signal Sf that slightly delays to the detected signal Ss.

When the detected signal Ss is at the second level (that is, when the lighting drive signal Sl is at a low-level voltage), the LED module 30 controls the oscillator 38 to go to sleep so that most of the circuits that consume more power inside the LED module 30 are slept and the low-level voltage of the lighting drive signal Sl consumes less power. Therefore, the low-level voltage will be not consumed too much and be not lower than the reset voltage Vr. When the detected signal Ss is at the first level (that is, when the lighting drive signal Sl is at a high-level voltage), the logic circuit 36 uses the clock signal Sck provided by the oscillator 38 to calculate the time duration Y (for example, a wider width is determined to be a logic "1" and a narrower width is determined to be a logic "0"). When the width of the detected signal Ss at the first level is the widest (i.e., the width X), it is determined as the latch signal, and the previous filtered signal Sf is latched. Finally, after latching for a short period of time, the latched signal Sk is provided to inform the completion of latching the drive command. In particular, since the latch signal is usually maintained for a long time and the time for determining the low-level lighting drive signal Sl is long to make the LED module 30 consume power for a long time, it is easy to produce a situation where the lighting drive signal Sl is lower than the reset voltage Vr. Therefore, the low-level latch signal changes to the high-level latch signal (i.e., the width X is the high-level voltage) by the controller 22 to avoid this situation that the lighting drive signal Sl is lower than the reset voltage Vr.

Figure 4:
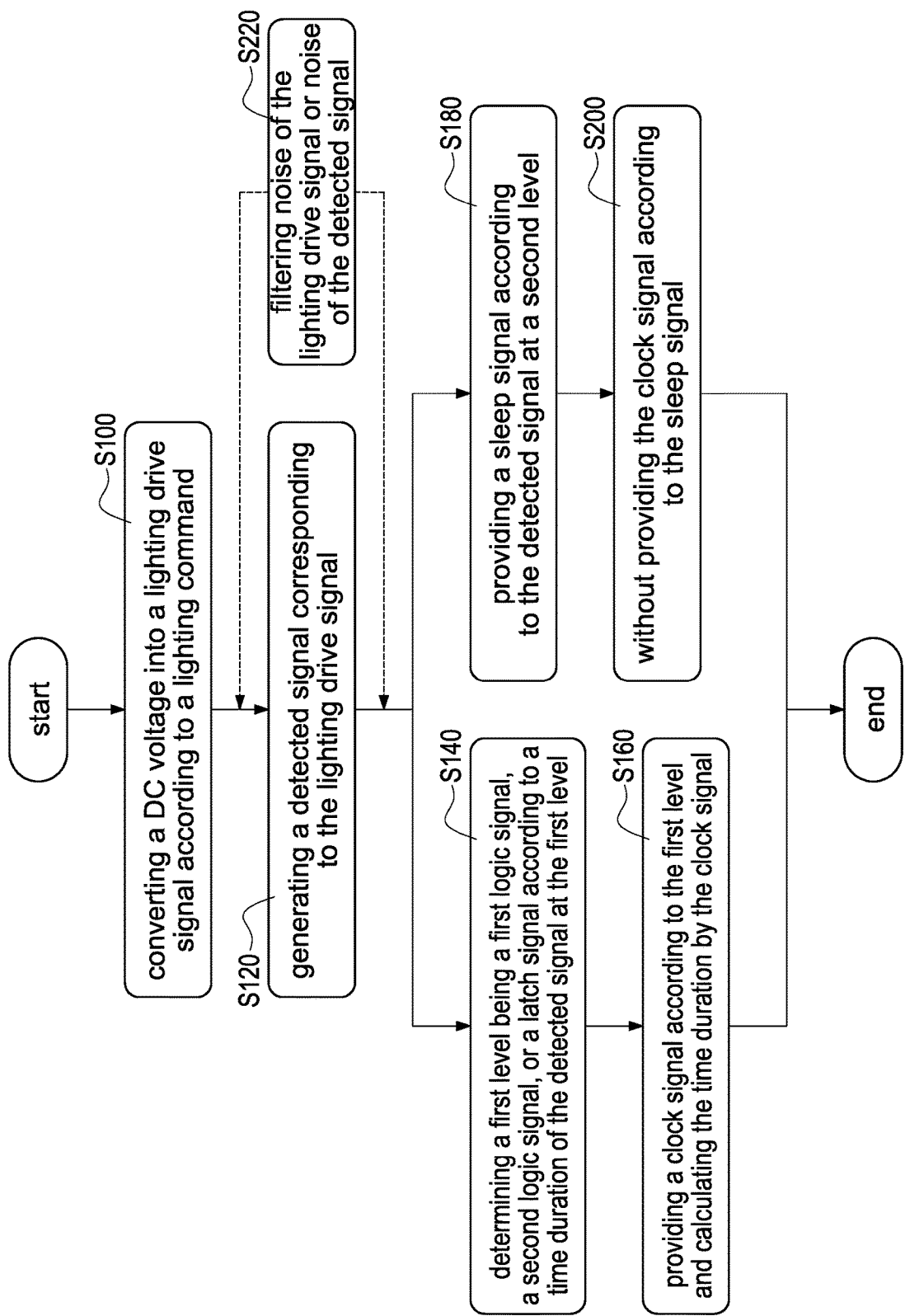
FIG. 4 is a flowchart of a signal control method of the LED light string control system according to the present disclosure.

Please refer to FIG. 4, which shows a flowchart of a signal control method of the LED light string control system according to the present disclosure, and also refer to FIG. 1 to FIG. 3. The signal control method includes steps of: converting a DC voltage into a lighting drive signal according to a lighting command (S100). In one embodiment, a controller 22 is used to provide a control signal Sc to control turning on or turning off a power switch 20 according to a lighting command Cl so as to convert the DC voltage Vdc into the lighting drive signal Sl. Afterward, generating a detected signal corresponding to the lighting drive signal (S120). In one embodiment, a detection circuit 34 is used to detect the lighting drive signal Sl to generate the detected signal Ss corresponding to the lighting drive signal Sl, for example, the detected signal Ss is complementary to the lighting drive signal Sl or proportional to the lighting drive signal Sl. Afterward, determining a first level being a first logic signal, a second logic signal, or a latch signal according to a time duration of the detected signal at the first level (S140). In one embodiment, a logic circuit 36 is used determines that the first level is the first logic signal (such as logic "0"), the second logic signal (such as logic "1"), or the latch signal according to the time duration of the detected signal Ss at the first level.

Afterward, providing a clock signal according to the first level and calculating the time duration by the clock signal (S160). In one embodiment, an oscillator 38 is used to provide a clock signal Sck to the logic circuit 36 notified by the detection circuit 34 or the logic circuit 36 for calculating the time duration according to the detected signal Ss at the first level so as to determine that the first level of the detected signal Ss is the first logic signal, the second logic signal, or the latch signal. Afterward, providing a sleep signal according to the detected signal at a second level (S180). In one embodiment, the logic circuit 36 is used to provide the sleep signal Ssp according to the detected signal Ss at the second level, or the detected signal Ss at the second level is directly used as the sleep signal Ssp for the oscillator 38. Finally, without providing the clock signal according to the sleep signal (S200). When the oscillator 38 receives the sleep signal Ssp, the oscillator 38 goes to sleep and does not provide the clock signal Sck so that internal circuits (such as latch circuits, drive circuits, etc.) operated based on the clock signal Sck will also go to sleep due to the absence of the clock signal Sck.

In order to avoid the rough edges or switching surges produced by the lighting drive signal Sl from affecting the detection accuracy of the time duration of the detected signal Ss, after or before the step (S120), filtering noise of the lighting drive signal or noise of the detected signal (S220). In one embodiment, a filter circuit 40 is used to filter noise of the lighting drive signal Sl or noise of the detected signal Ss to avoid the rough edges or switching surges from affecting the detection accuracy of the time duration of the detected signal Ss.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A light-emitting diode (LED) light string control system using carrier signal control, comprising:
    a control module configured to convert a DC voltage into a lighting drive signal according to a lighting command, and
    an LED light string comprising at least one LED module, and coupled to the control module, and the at least one LED module comprising:
        a detection circuit configured to generate a detected signal corresponding to the lighting drive signal,
        a logic circuit configured to determine a first level being a first logic signal, a second logic signal, or a latch signal according to a time duration of the detected signal at the first level, and an oscillator configured to provide a clock signal to the logic circuit for calculating the time duration according to the first level and go into a sleep mode according to a sleep signal, wherein the logic circuit provides the sleep signal according to the detected signal at a second level, or the detected signal at the second level is used as the sleep signal for the oscillator.

2. The LED light string control system as claimed in claim 1, wherein the at least one LED module further comprises at least one LED, wherein the at least one LED module latches the first logic signal and the second logic signal as a drive command, and controls lighting behavior of the at least one LED according to the drive command.

3. The LED light string control system as claimed in claim 1, wherein the oscillator does not provide the clock signal when sleeping.

4. The LED light string control system as claimed in claim 1, wherein the at least one LED module further comprises:

a filter circuit coupled to the detection circuit, and the filter circuit configured to filter noise of the lighting drive signal or noise of the detected signal.

5. The LED light string control system as claimed in claim 1, wherein the control module comprises:

a power switch coupled to the LED light string, and configured to receive the DC voltage, and a controller coupled to the power switch, and configured to receive the lighting command, wherein the controller provides a control signal to control turning on or turning off the power switch according to the lighting command to convert the DC voltage into the lighting drive signal.

6. The LED light string control system as claimed in claim 1, wherein the at least one LED module is plural, and the LED modules are coupled in series or coupled in parallel.

7. A signal control method of a light-emitting diode (LED) light string, comprising steps of:

converting a DC voltage into a lighting drive signal according to a lighting command, generating a detected signal corresponding to the lighting drive signal, determining a first level being a first logic signal, a second logic signal, or a latch signal according to a time duration of the detected signal at the first level, and providing a clock signal according to the first level and calculating the time duration by the clock signal.

8. The signal control method as claimed in claim 7, further comprising steps of:

providing a sleep signal according to the detected signal at a second level, and without providing the clock signal according to the sleep signal.

9. The signal control method as claimed in claim 7, further comprising a step of:

providing a control signal to control turning on or turning off a power switch according to the lighting command to convert the DC voltage into the lighting drive signal.

10. The signal control method as claimed in claim 7, further comprising a step of:

filtering noise of the lighting drive signal or noise of the detected signal.

* * * * *